US010317924B2

(12) United States Patent
Schwarz et al.

(10) Patent No.: US 10,317,924 B2
(45) Date of Patent: *Jun. 11, 2019

(54) COLLABORATIVE LOAD BALANCING WITHIN A COMMUNITY OF ENERGY NODES

(71) Applicant: NEC CORPORATION, Tokyo (JP)

(72) Inventors: Maja Schwarz, Heidelberg (DE); Hanno Hildmann, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 138 days.

This patent is subject to a terminal disclaimer.

(21) Appl. No.: 15/687,604

(22) Filed: Aug. 28, 2017

(65) Prior Publication Data

US 2018/0011507 A1 Jan. 11, 2018

Related U.S. Application Data

(63) Continuation of application No. 14/468,358, filed on Aug. 26, 2014, now Pat. No. 9,778,673.

(51) Int. Cl.
*G05D 3/12* (2006.01)
*G05F 1/66* (2006.01)

(52) U.S. Cl.
CPC ..................................... *G05F 1/66* (2013.01)

(58) Field of Classification Search
CPC ........................................................ G05F 1/66
See application file for complete search history.

(56) References Cited

U.S. PATENT DOCUMENTS

| 6,601,084 | B1 | 7/2003 | Bhaskaran et al. |
| 9,477,279 | B1 | 10/2016 | Piszczek et al. |
| 2004/0254899 | A1* | 12/2004 | Abe .................... G06Q 10/06 705/412 |
| 2005/0015283 | A1* | 1/2005 | Iino .................. G06Q 10/06315 705/4 |
| 2007/0067068 | A1* | 3/2007 | Havlena ............... G05B 13/048 700/291 |
| 2009/0062969 | A1 | 3/2009 | Chandra et al. |
| 2010/0179704 | A1* | 7/2010 | Ozog ............... G06Q 10/06315 700/291 |
| 2011/0055036 | A1 | 3/2011 | Helfan |

(Continued)

*Primary Examiner* — Adam Lee
(74) *Attorney, Agent, or Firm* — Leydig, Voit & Mayer, Ltd.

(57) ABSTRACT

A system for collaborative load balancing within a community of a plurality of energy nodes includes a central allocation server and a plurality of local agent servers. Each of the local agent servers is connected to a respective one of the energy nodes and has a processor configured to: receive input variables or parameters; predict, using the received input variables or parameters, a non-zero energy generation amount that power generation equipment can generate over a planning horizon and an energy consumption amount that will be consumed over the planning horizon; solve, using the energy generation amount and the energy consumption amount, an optimization problem over the planning horizon; and communicate a solution to the optimization problem to the central allocation server. Each of the energy nodes includes power generation equipment, power transmission equipment, and power storage equipment.

15 Claims, 3 Drawing Sheets

(56) References Cited

U.S. PATENT DOCUMENTS

| | | |
|---|---|---|
| 2012/0010757 A1* | 1/2012 | Francino ................ G05B 15/02 |
| | | 700/291 |
| 2012/0010758 A1 | 1/2012 | Francino et al. |
| 2012/0078434 A1 | 3/2012 | Hindi et al. |
| 2012/0185106 A1 | 7/2012 | Ghosh et al. |
| 2014/0058571 A1 | 2/2014 | Hooshmand et al. |
| 2014/0094980 A1 | 4/2014 | Saito et al. |
| 2014/0350743 A1 | 11/2014 | Asghari et al. |

* cited by examiner

COLLABORATIVE LOAD BALANCING WITHIN A COMMUNITY OF ENERGY NODES

CROSS-REFERENCE TO PRIOR APPLICATION

This application is a continuation application of U.S. application Ser. No. 14/468,358 filed on Aug. 26, 2014, the entire contents of which are incorporated by reference herein.

FIELD

The present invention relates to a prosumer community (i.e., a community of users which both produce and consume energy) having energy nodes and a central allocation control device, as well as to local agent devices useable in a prosumer community for controlling individual energy nodes and a method of distributing energy resources in a prosumer community. The present invention also relates to the use of such energy nodes, local agent devices and central allocation control device, for example, in a community of energy producers or computing/data centers.

BACKGROUND

Recent technology improvements relating to the use of renewable energy sources (RES) make various renewable energy systems (RES systems) more available and easier to deploy, even in urban areas. Governments' targets to further increase the portion of renewable energy in total energy consumption will result in ubiquity of both utility scale and residential RES systems. Residential RES systems have been encouraged through guaranteed feed-in rates. However, when a decrease in the cost of RES systems leads to more grid-parity, the government incentives will be less necessary and local energy consumption can become more economical. The local consumption of energy is also motivated by the independence from the grid and a devotion to green energy. On the other hand, a wider use of distributed energy resources (DER) also has its downsides due to the grid stability issues and an increased need for load balancing.

These issues with integration of RES stem from the intermittency and uncontrollability of renewable energy. Users of all types of RES systems, from the residential sector to the large-scale energy producers selling their energy in day-ahead markets, suffer from these two aspects of RES.

In order to mitigate these issues related to RES integration, many different approaches have been proposed. The most common approach is to use batteries as electricity storage to store any excess in energy generation for later use, when generation is not sufficient to meet the demand. However, the use of batteries is a costly solution and their capacity is never sufficient to perfectly mitigate the uncontrollability of RES. This means that the storage might not be big enough to store entire surplus, or the maximal discharge rate is not sufficient to cover a difference between demand and supply in a given moment. In such a case, the energy must be consumed from a backup source, which is normally an electric utility providing energy in the given area.

SUMMARY

In an embodiment, the present invention provides a system for collaborative load balancing within a community of a plurality of energy nodes. The system comprises a central allocation server having a processor, and a plurality of local agent servers, each of the local agent servers being connected to a respective one of the energy nodes and having a processor configured to: receive input variables or parameters from the respective one of the energy nodes; predict, using the received input variables or parameters, a non-zero energy generation amount that power generation equipment of the respective one of the energy nodes can generate over a planning horizon and an energy consumption amount that the respective one of the energy nodes will consume over the planning horizon; solve, using the energy generation amount and the energy consumption amount, an optimization problem over the planning horizon; and communicate a solution to the optimization problem to the central allocation server, wherein the processor of the central allocation server is configured to: receive the solutions to the optimization problem from each of the local agent servers, and run an allocation algorithm using the solutions received from each of the local agent servers to determine an amount of energy to be received from or supplied to individual ones of the energy nodes so as to provide the collaborative load balancing within the community, and wherein each of the energy nodes includes power generation equipment, power transmission equipment, and power storage equipment.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
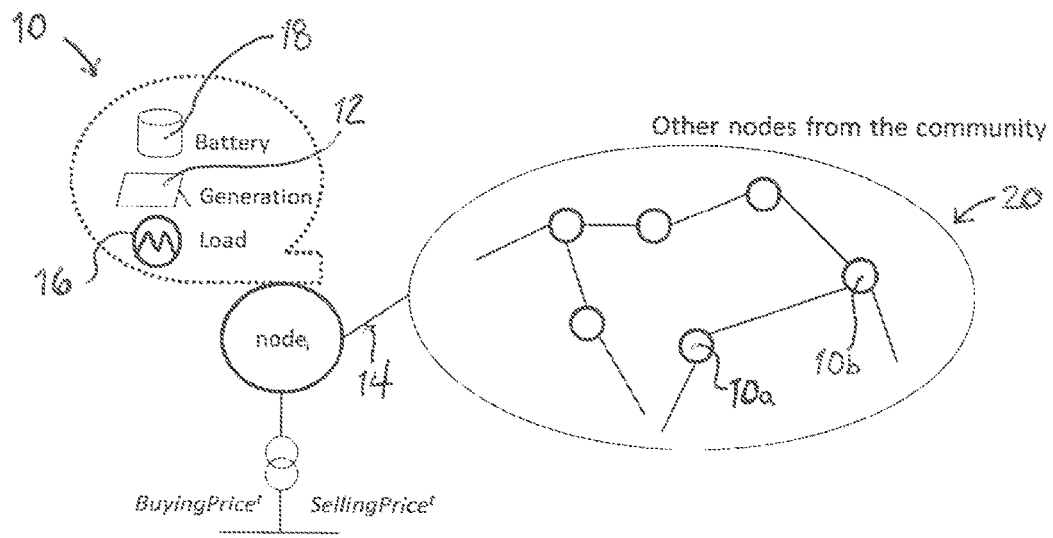
FIG. 1 is a schematic view of an energy node within a prosumer community.

The intermittency and uncontrollability of RES discussed above causes individual users who both consume and produce energy (hereinafter referred to as prosumers) to have an imbalance between their needs and available energy at given times and inevitably results in the over-usage of resources and associated costs.

In an embodiment, the present invention provides for an improved performance balance and allows a prosumer to manage its own generation capability and storage capacity. Accordingly, an increase in the percentage of local electric load that is served by renewable energy is possible. Furthermore, overall and individual energy costs are reduced since the renewable energy is assumed to be free after the initial investment costs and the need to purchase additional energy from outside sources will be greatly reduced or completely eliminated. Of course, the increased use of RES and improvements in the RES systems made possible by the present invention will provide a large number of environmental advantages.

In order to improve load balancing performance of a single prosumer, the supply and demand across a larger set of prosumers is considered and used in an embodiment of the present invention. This advantageously provides for a collaboration of the prosumers which are connected to each other through a distribution network. Through the network, the energy node of one prosumer can share an energy surplus with another energy node of a different prosumer in the network needing energy. Furthermore, the individual energy nodes of the prosumers can further improve their own balancing performance by the use of storage of other energy nodes in the network. Within the network, the resources can be allocated fairly and used efficiently while providing freedom to all users to decide whether to participate at a given moment, allowing them to optimize their own goals.

In a further embodiment, the system can be used by commercial energy producers who can collaborate with each other to meet their loads. In this embodiment, the commercial energy producers, like the systems of the prosumers, can be considered to be the energy nodes able to predict their own generation and usage requirements and/or collaborate with other energy producers to provide an overall improved performance balance. Commercial energy producers are subject to fluctuations and uncertainty, for example, by using day-ahead markets. For example, the system according to an embodiment of the invention can advantageously be used to evaluate whether generation of targets that are agreed beforehand in the day-ahead markets can be met, for example, based on predicted generation possible before such a time using weather forecasts and other relevant prediction parameters and, if not, or if there will be a surplus can collaborate with the other energy producers.

Additional technical details about a smart grid scheme, optimization of consumption therein, electricity-thermal coupling and electric and thermal storage can be found in U.S. Application No. 62/023,210, the entire contents of which is hereby incorporated by reference herein.

As used herein, an energy node refers to the power generation equipment, power conversion or transmission equipment and/or power storage equipment, for example, of a prosumer or energy producer, or of a computer or data center, as discussed below. A community refers to an association of energy nodes. In an embodiment, the community itself can also have power generation equipment, power conversion or transmission equipment and/or power storage equipment and this equipment can be associated with and controlled by the central allocation control device. Additionally, the following assumptions are made in an embodiment:

Each energy node has its own local uncontrollable energy generation, electric load and electricity storage;
The energy nodes are connected to an electrical grid from which they can buy electricity at price $BuyingPrice^t$ (the price can depend on time t);
The energy nodes can also sell electrical energy at price $SellingPrice^t$ ($SellingPrice^t \geq 0$; if the price is always zero, it means that the node cannot sell energy)
The energy nodes are connected to each other through a distribution network—they can share energy and avoid buying it from the utility. Energy nodes with energy surplus can also give energy to the community and vice versa;

In an embodiment, it is envisioned that, for the system to be useful, $SellingPrice^{t_1} < BuyingPrice^{t_2}$ for a sufficient number of time periods $t_1$ and $t_2$ ($t_1 \leq t_2$) because there would be less of a use for collaboration amongst the energy nodes if an energy node could always sell its surplus at a good price ($SellingPrice^{t_1} \geq BuyingPrice^{t_2}$). This scenario ($SellingPrice^{t_1} \geq BuyingPrice^{t_2}$), if it exists currently in some communities, is not likely to be a permanent state of affairs as it is not a realistic market model.

Referring to FIG. 1, the structure of the energy node 10 includes power generation equipment 12 (for example, photovoltaic (PV) panels or wind turbines), power transmission equipment 14 (for example, cables and electrical connectors) from the power generation equipment 12 for use in handling its own power load 16 and for transfer to the other nodes 10a, 10b in the community 20 or to an energy producer or distributor. The energy nodes 10 are connected to each other in the community 20 through a distribution electricity grid.

Figure 2:
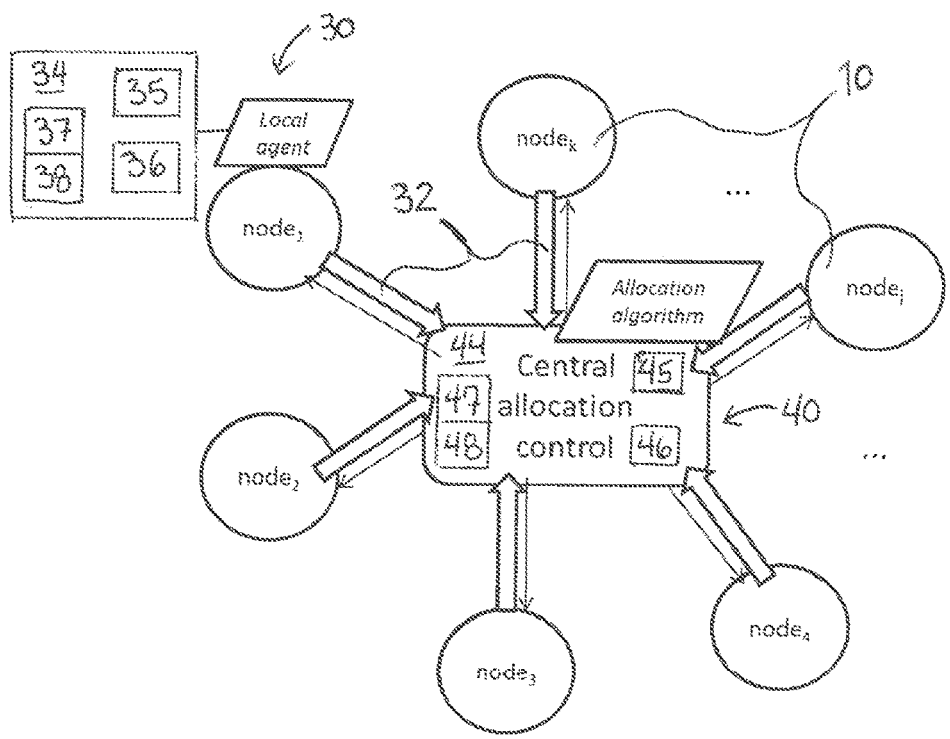
FIG. 2 is a schematic view of a prosumer community control system.

Referring to FIG. 2, a system according to an embodiment of the present invention includes the central allocation control device 40 processing information received by the local agent devices 30 of the energy nodes 10, via communications 32, in accordance with an allocation algorithm 42 running on the central allocation control device 40. The central control device 40 can include, for example, a server device 44, or computational processing device with a computational processor 45 and memory devices 46, a communication-receiving unit 47 and a communication-transmitting unit 48. The local agent devices 30 can also include, for example, a server device 34, or computational processing device with a computational processor 35 and memory devices 36, a communication-receiving unit 37 and a communication-transmitting unit 38 and can be configured to receive, store and process energy generation and usage data over time from the energy nodes 10. The local agent devices 30 act autonomously on behalf of their respective energy nodes 10. Each local agent device 30 makes decisions independently, representing the interests of its owner. On the other hand, the central allocation control device 40 acts on behalf of the entire energy node community 20, distributing the available energy surplus to the energy nodes 10 currently requesting energy and maintaining fairness. Fairness is a mandatory requirement for an embodiment of the system in which participants form a coalition in order to improve their results. Thus, in this embodiment, the allocation algorithm 42 run by the central allocation control device 40 allocates a surplus of energy based on a system of credits reflecting how much each energy node 10 contributed to the community pool in the past.

Figure 3:
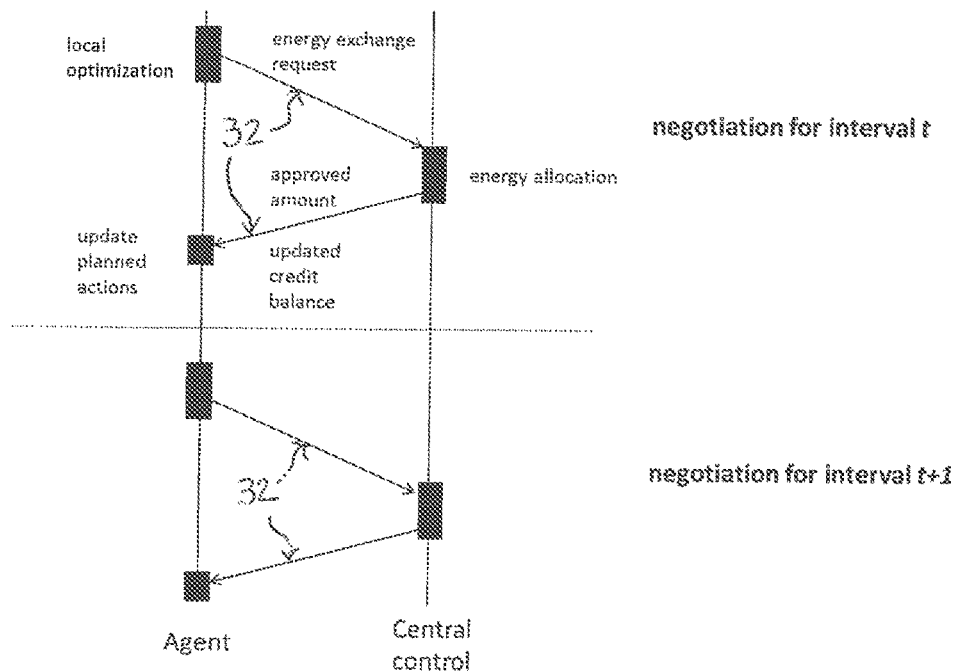
FIG. 3 is a schematic view of communications between a local agent device and a central allocation control device.

Referring to FIG. 3, communications 32 between the local agent devices 30 and central allocation control device 40 are shown in more detail. The central allocation control device 40 is therefore connected to the energy nodes 10 by being connected through a communication network to the local agent devices 30. In each negotiation round, all local agent devices 30 transmit requests to receive/contribute energy from/to the community pool. The central allocation control device 40 allocates the currently offered energy to the energy nodes 10 of the local agent devices 30 currently requesting energy and informs the local agent devices 30 of the approved amounts to receive/contribute. Furthermore, the central allocation control device 40 informs the local agent devices 30 about the updated credit balance of their respective associated energy nodes 10. Once a local agent device 30 is informed about the granted amount, it can manage the battery charging/discharging of the power storage devices of its energy node 10 and/or make further grid exchange decisions. Preferably, each negotiation in time intervals t, t+1 . . . t+n is performed beforehand and is repeated depending on a selected frequency. For example, the allocation can be performed once every minute (t=1 minute).

The local agent devices 30 are programmed to process energy generation and usage information from their energy nodes 10, as well as to predict energy generation and usage, in order to make the following determinations in a given time interval t:

How much energy will the energy node 10 offer to the community 20 or request from community 20 over the next interval t (note that this amount will not necessarily the amount that will be confirmed depending on what the central control allocation device 40 determines will be best for the community 20); and How much energy will the energy node 10 charge into/discharge from batteries over the next interval t+1;

These determinations control how much energy will be received from/contributed to the community 20 in order to balance to a difference between a current load and generation of the individual energy node 10.

In particular, a local agent device 30 first computes a desired exchange amount by estimating how much energy the energy node 10 will require/can contribute over a time interval t. If the entire amount is not granted, the local agent device 30 updates its decisions replacing the desired exchange amount with the community 20 by the granted amount.

Figure 4:
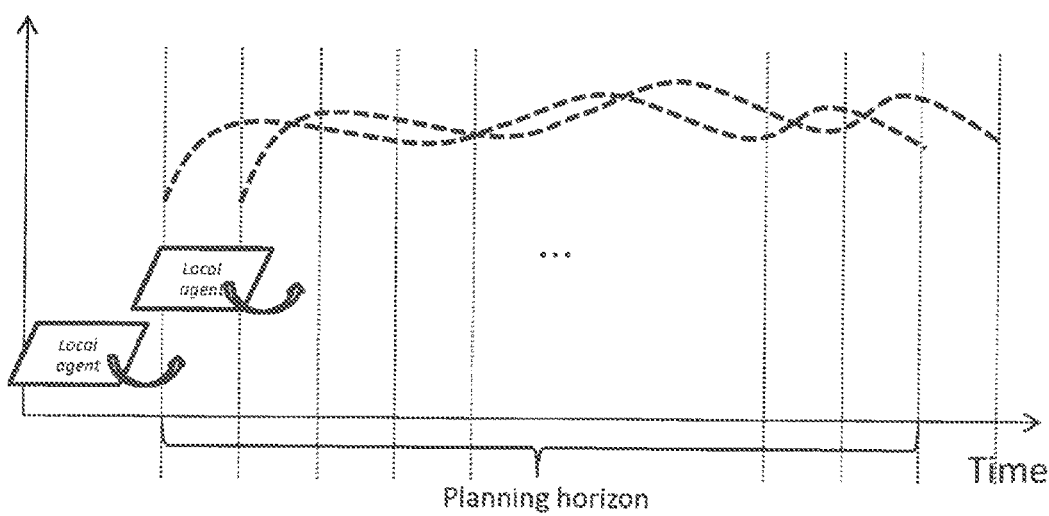
FIG. 4 is a graph of a planning horizon of local agent devices for energy nodes of the prosumer community.

In order to compute the desired exchange amount with the community 20 over a time interval t, the local agent device 30 solves an optimization problem over a planning horizon (e.g. a period of time such as 24 hours), as illustrated in FIG. 4. This problem optimizes only the goals of the local agent device 30 which is solving it and takes into account that generous actions of its energy node 10 should result in a returned benefit. For example, when the energy node 10 contributes energy it can acquire credits or receive monetary benefit. The part of the solution corresponding to the next time interval t is used to determine how much energy should be exchanged with the community 20, the battery and/or the grid, while the rest of the solution (i.e., corresponding to the rest of the planning horizon and not the upcoming time interval) can be discarded. The optimization problem is solved again for the next negotiation round of the planning horizon starting from the time interval t+1 after the time interval t and, as mentioned above, can update the desired exchange amount with a granted amount after each negotiation round.

Certain forecasts are used in the optimization problem. The local agent device 30 predicts a supply, or an amount of energy generation possible, over the planning horizon for its energy node 10. This prediction can be based, for example, on the weather forecast, past generation amounts and/or other relevant parameters. Furthermore, the local agent device 30 estimates demand, or how much energy will be needed, of its energy node 10 over the planning horizon. This estimate can be made based on the consumption data of previous time periods (for example, taking into account the time of the year (summer vs. winter) or week (weekday or weekend)) and/or based on input from a user. For example, the local agent devices 30 can have access to a calendar where the user can input certain time periods when reduced/increased consumption of energy will expected or the local agent devices can predict certain periods of reduced/increased energy consumption based on certain calendar events, such as being away on vacation. Besides its own demand and supply forecasts, the local agent device 30 can also make rough estimates of the possible energy exchange with the community 20 over the planning horizon. This rough estimate advantageously allows the local agent device 30 to estimate the chances of obtaining energy from the community 20 in a given time interval t ahead of time, for example, based on its credit balance and planned actions, such as giving its own surplus to the community 20, as well as, for example, past energy amounts obtained from the community 20 or an overall supply of energy in the community 20. This type of information can be provided by the central allocation control device 40 as an additional functionality described in further detail below. Additionally, where electricity buying and selling prices are changing dynamically, their values can be predicted and advantageously used in the optimization problem, for example, in order to better determine the best times to buy/sell.

The processing performed by the local agent devices 30 to solve one embodiment of the optimization problem is discussed in detail in the following. The optimization variables and parameters are given in Table 1 below.

TABLE 1

| Variables and Parameters | | |
|---|---|---|
| $L_i^t$ | Load at node i over period t | Predicted parameter |
| $G_i^t$ | Generation at node i over period t | Predicted parameter |
| $ToGrid_i^t$ | Power sold to grid at node i over period t | Control variable |
| $FromGrid_i^t$ | Power bought from grid at node i over period t | Control variable |
| $B_i^t$ | Battery power charged/discharged at node i over period t | Control variable |
| $P_i^t$ | Power exchanged with the community at node i over period t | Control variable |
| $SellingPrice^t$ | Selling electricity price over period t | Parameter (might be predicted) |
| $BuyingPrice^t$ | Buying electricity price over period t | Parameter (might be predicted) |
| $E_{Si}^t$ | Amount of energy stored at node i at the beginning of period t | Auxiliary variable |

TABLE 1-continued

Variables and Parameters

| | | |
|---|---|---|
| $E_{Ci}$ | Energy capacity of the storage at node i | Parameter |
| $R_i$ | Maximal power rate of storage at node i | Parameter |
| $Credit_i^t$ | Number of credits of user i at the beginning of period t | Auxiliary variable |
| $expectedMaxObtained_i^t$ | How much power node i could maximally get from the community over period t | Parameter (received from the central allocation control device as an estimation) |
| $expectedMaxTaken_i^t$ | How much power the community would maximally take from node i over period t | Parameter (received from the central allocation control device as an estimation) |
| duration | Duration of time interval | Parameter |

The values for the variables and parameters are stored in memory devices of the local agent devices 30 and/or the central allocation control device 40 where they are based on past performance or inputs from the energy nodes, such as the storage amount and capacity of the batteries.

The objective in this embodiment is to maximize the user's profit (e.g. to minimize its costs) by solving following algorithms:

$$\max \Sigma_t (SellingPrice^t * ToGrid_i^t - BuyingPrice^t * FromGrid_i^t),$$

subject to the constraints:
Balance equation

For all $t$: $B_i^t + P_i^t + FromGrid_i^t - ToGrid_i^t + G_i^t - L_i^t = 0$

Positive variables

For all t: $FromGrid_i^t \geq 0$, $ToGrid_i^t \geq 0$

Battery charging/discharging–energy capacity

For all $t$: $0 \leq E_{Si}^t \leq E_{Ci}$, $E_{Si}^{t-1} + B_i^t * duration = E_{Si}^t$ Battery charging/discharging–power rates For all $t$: $-R_i \leq B_i^t \leq R_i$ Credit updates For all $t$: $Credit_i^t = Credit_i^{t-1} + P_i^{t-1}$ Expected possible exchange with the community For all t: $expectedMaxTaken_i^t \leq P_i^t \leq expectedMaxObtained_i^t$.

Figure 5:
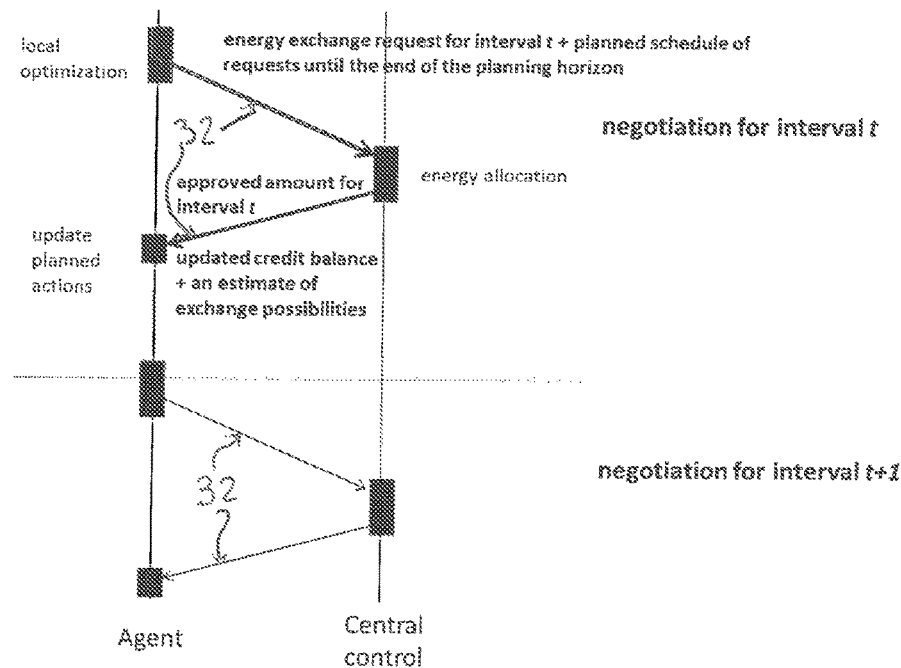
FIG. 5 is a schematic view of extended communications between the local agent device and the central allocation control device.

The parameters $expectedMaxObtained_i^t$ and $expectedMaxTaken_i^t$ are functions of a number of credits attributed to the energy node 10 at the beginning of the considered interval t. These parameters represent an estimation how much power the node can expect to get from the community 20 ($expectedMaxObtained_i^t$), or how much the community 20 could maximally take from the node ($expectedMaxTaken_i^t$). In an embodiment, user predictions of demand and supply expected of their own energy node 10 to the community 20 over the planning horizon are used to estimate these parameters. To permit such estimates based on user predictions, the communications 32 between the local agent devices 30 and the central allocation control device 40 are extended as illustrated in FIG. 5.

The whole loop consists of the following steps:
The local agent devices 30 of each energy node 10 solves its optimization problem and informs the central allocation control device 40 of the desired energy exchange with the community 20 over the next time interval t and of its currently planned exchanges over the rest of the planning horizon (at usual time interval resolution);

The central allocation control device 40 allocates any energy surplus of the time interval t to the energy nodes 10 of the requesting local agent devices 30 and communicates the updated current balance to each node;

The central allocation control device 40, preferably after allocating the energy surplus, runs the allocation algorithm 42 for each time interval t, t+1 . . . t+n of the rest of the planning horizon and determines how much supply and demand would be available, keeping the track of credit distribution among the local agent devices 30; and The central allocation control device 40 communicates to each local agent device 30 an estimation of the possible energy exchange as a function of the number of credits at the beginning of each of the considered intervals, for example, using the allocation algorithm 42.

Each of the local agent devices 30 solves the optimization problem for the next planning horizon (an interval of time after the previous optimization) using the estimates provided by the central allocation control device. Since the planning horizon is shifted forward an interval, only the estimate for the last interval is missing. Because the impact of a single interval should not be significant, it is possible in this case to make a simple approximation of the constraints for the last interval. In a first iteration of the system in which previous solutions or predictions of the local agent devices 30 are not available, the expected values for the possible energy exchanges with the community 20 can be set to rough estimates.

Figure 6:
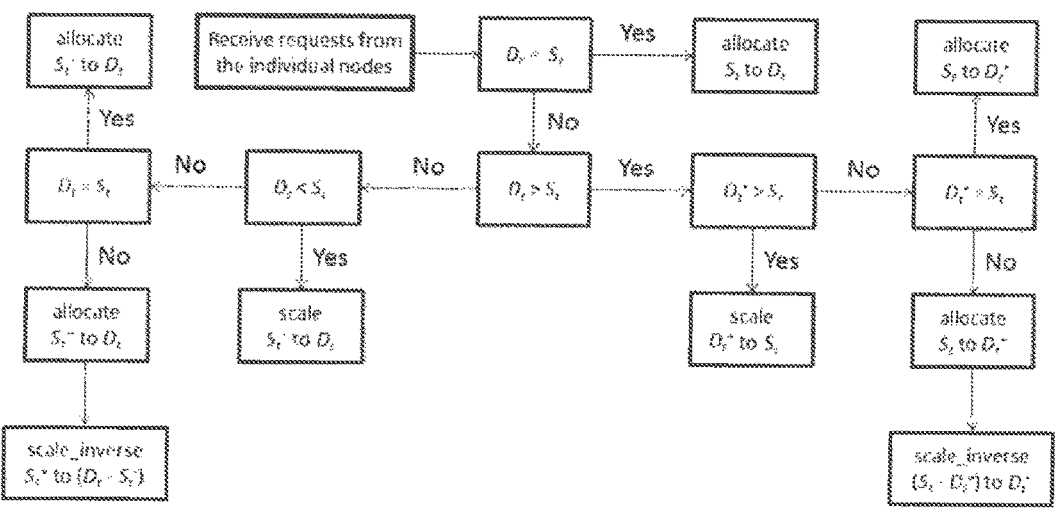
FIG. 6 is a flowchart of a process flow implemented by a computational processor of the central allocation control device.

The central allocation control device 40 processes the solutions from each of the optimization problems of the individual energy nodes 10 communicated by their local agent devices 30 in accordance with the allocation algorithm 42, one particular embodiment of which will be described in the following with reference to FIG. 6. The central allocation control device 40 can thereby allocate an energy surplus available over a time interval t to the local agent devices 30 requesting energy from the community 20. Over certain time intervals t, t+1 . . . t+n, the energy supply to the community 20 can be higher than the energy demand from the community 20. In the case of higher demand, a high credit balance should help the demanding local agent devices 30 to get their desired energy amounts. In the case of higher supply, the local agent devices 30 with lower credit balances will have higher priority to give energy to the community and improve their credit balance.

The credit balance of a local agent device 30, or of its energy node 10, is represented by its number of credits credit$_i^t$ reflecting whether the energy node 10 has supplied or drawn from the community 20 more in the past. The bookkeeping for all credits can be maintained by the central allocation control device 40.

At any cycle of the operation, each of the local energy devices 30 participating in the allocation will send a request of either demand or supply based on the solution to the optimization problem discussed above. For example, the local agent device 30 of a participating energy node 10 will communicate to the central allocation control device 40 a single positive or negative value for the next time interval, depending on whether it requests to supply energy to (i.e., supply) or to receive energy from (i.e., demand) the community 20. At any cycle of the operation t, there is an aggregated demand $D_t$ and a supply $S_t$ over all participating energy nodes 10 in the system. These are the sums of the individual demand $d_i$ or supply $s_i$, respectively for each individual energy node i from the participating set.

Depending on the values of $D_t$ and $S_t$, there are three cases: $D_t = S_t$; $D_t > S_t$; and $D_t < S_t$ $D_t = S_t$: This case is trivial, the supply matches demand and the central allocation control device 40 can allocate the requested amounts and update credits for each energy node 10, respectively.

$D_t > S_t$: The requested demand is higher than the requested supply. This means that every energy node 10 that has requested to supply energy will be able to contribute the desired amount, but as far as the energy nodes 10 that requested to receive energy is concerned, not every node will get the full amount it requested; due to this, a means to ensure fairness is implemented, which according to an embodiment, is implemented as described in the following.

The central allocation control device 40 first considers the energy nodes 10 that have in the past supplied more than they have requested (i.e. the nodes that currently have a positive credit). In the process flow of FIG. 6, this group of energy nodes 10 is denoted by $D_t^+$ (the nodes with a positive credit ranking at time t that are currently requesting energy).

There are now three possible cases again: $D_t^+ = S_t$; $D_t^+ > S_t$; and $D_t^+ < S_t$ $D_t^+ = S_t$: The central allocation control device 40 can allocate the requested amounts and update credits for each energy node 10 with the positive credit, respectively.

$D_t^+ > S_t$: This case means that there is still more demand by the energy nodes 10 with positive credit than there is supply. In this case, the central allocation control device 40 scales the amount allocated to each energy node 10 in $D_t^+$ by their credit (described below as scale).

$D_t^+ < S_t$: This case means that the central allocation control device 40 recognizes that the community 20 has a greater supply than the energy nodes 10 with positive credit have requested. The central allocation control device 40, as a first step here, allocates to all energy nodes 10 with a positive credit the full amount these energy nodes 10 have requested. Then, as a second step, the central allocation control device 40 allocates the remaining supply to the energy nodes 10 that do not have a positive credit (denoted by $D_t^-$) and that have also requested to receive energy. This process is described below as scale$^{inv}$.

$D_t < S_t$: In this case, the requested demand is less than the requested supply. This means that while all energy nodes 10 that requested to receive energy from the community 20 will get the full amount, not all energy nodes that requested to supply energy can contribute the full amount they offered. The process here is very similar to the process for $D_t > S_t$, but with $D_t$ and $S_t$ reversed and priority given first to the energy nodes 10 that are offering to supply energy and that have, in the past, supplied less than they have received from the community 20 (denoted by $S_t^-$, the energy nodes 10 that are offering to supply at time t and that have, at this time, a negative credit).

There are now three possible cases again: $D_t = S_t^-$; $D_t > S_t^-$; and $D_t < S_t^-$ $D_t = S_t^-$: The central allocation control device 40 can allocate the requested amounts and update credits for each energy node 10 with the negative credit, respectively.

$D_t < S_t^-$: This case means that the energy nodes 10 with a negative credit are requesting to supply more energy to the community 20 than there is demand for. In this case, the central allocation control device 40 scales the amount of energy the energy nodes 10 with a negative credit can supply by their credit (described below as scale).

$D_t > S_t^-$: This case means that the central allocation control device 40 recognizes that the community 20 has a greater demand to receive energy than the energy nodes 10 with negative credit have requested to supply. The central allocation control device 40, as a first step here, allows all energy nodes 10 with a negative credit to supply the full amount these energy nodes 10 have requested. Then, as a second step, the central allocation control device 40 allows the energy nodes that do not have a negative credit (denoted by $S_t^+$) to supply energy to meet the remaining demand. This process is described below as scale$^{inv}$.

The algorithm scale (Supply to Demand): When scaling supply (S) to demand (D) (i.e. when there is more supply than there is demand), the central allocation control device 40 calculates the sum of all credits of all energy nodes 10 that have requested to supply (denoted by sum_credits) and then assigns each energy node 10 in S a part of the available demand: portion_of_demand_node$_i$=credit$_i$/sum_credits. The central allocation control device 40 then allocates the demand, which can result (for each node$_i$) in 3 possible cases:

The allocated amount matches the requested amount. In this case, the credits are updated accordingly and the energy node is removed from S. The allocated amount is also deducted from D.

The allocated amount exceeds the requested amount. In this case, the requested amount only is allocated to the energy node, the credits are updated accordingly, the energy node is removed from S and the allocated amount is deducted from D. In this case, there is some extra amount left in D.

The allocated amount is less than the requested amount. In this case, the full allocated amount is allocated to the energy node, the credits are updated accordingly, the allocated amount is deducted from D and the requested amount of the energy node is updated in S.

When all nodes have been considered this way, the result will either be an empty S (in which case, the process scale is complete) a smaller S than before. In the latter case, the central allocation control device 40 repeats the steps above, and the process scale will deterministically terminate after at most |S| iterations.

The algorithm scale (Demand to Supply): When scaling demand (D) to supply (S) (i.e. when there is more demand than there is supply), the central allocation control device 40 calculates the sum of all credits of all energy nodes 10 that have requested to receive energy (denoted by sum_credits) and then assigns each energy node 10 in D a part of the available supply: portion_of_supply_node$_i$=credit$_i$/sum_credits. The central allocation control device 40 then allocates the supply, which can result (for each node$_i$) in 3 possible cases:

The allocated amount matches the requested amount. In this case, the credits are updated accordingly and the energy node is removed from D. The allocated amount is also deducted from S.

The allocated amount exceeds the requested amount. In this case, the requested amount only is allocated to the energy node, the credits are updated accordingly, the energy node is removed from D and the allocated amount is deducted from S. In this case, there is some extra amount left in S.

The allocated amount is less than the requested amount. In this case, the full allocated amount is allocated to the energy node, the credits are updated accordingly, the allocated amount is deducted from S and the requested amount of the energy node is updated in D.

When all nodes have been considered this way, the result will either be an empty D (in which case, the process scale is complete) a smaller D than before. In the latter case, the central allocation control device 40 repeats the steps above, and the process scale will deterministically terminate after at most |D| iterations.

The algorithm scale$^{inv}$: This case is similar to the two above, but with the difference that excess amounts are now being allocated. This means that the energy nodes 10 that should be given priority (for demand: the energy nodes that have in the past supplied more, and for supply: the energy nodes that have received more in the past) are already satisfied. In this case, it is possible to (partially) honor the requests of energy nodes that will further increase their positive balance, or further decrease their debt if their current number of credits is negative. A difference to the above algorithm scale is that, instead of favoring the nodes with the highest absolute value of the credit balance, the energy nodes that are the closest to zero are favored. To achieve this, the way the ratio of the allocated resource is calculated by the central allocation control device 40 is changed as follows: Above, in the process scale, the credits of the energy nodes were summed and the amount to be allocated was then scaled by portion_of_demand_node$_i$=credit$_i$/sum_credits. Instead, in the process scale$^{inv}$, credit$_i$ is replaces by $1/(|credit_i|+1)$. This has two effects:

The larger the absolute value of the credit, the lower the allocated amount will be.

By adding 1 to the denominator, it is possible a) to avoid division by zero and b) to strongly favor the energy nodes having a low number of credits. The latter is of interest, in an embodiment, to provide a system that favors energy nodes that aim for a balanced interaction with the community.

As above with the process scale, the process scale$^{inv}$, is repeated until the smaller of S and D is empty (which is a finite process).

Accordingly, the central allocation control device 40 is able to provide the collaborative load balancing by optimally determining which energy nodes 10 will supply energy to the community 20 and which energy nodes 10 will receive energy from the community 20, as well as the relevant amounts. The transfers amongst the energy nodes 10 can take place using gateways or the power transmission equipment of the energy nodes 10 (in this case, the energy nodes need to be electrically connected to each other, for example, to transfer energy between the power storage equipment thereof) and/or the electrical distribution grid. Preferably, the energy transfers to/from individual ones of the energy nodes takes place in the same manner as buying/selling power from the electrical utility through the distribution network. A Distribution System Operator (DSO) can support feed-ins to energy nodes 10 from other ones of the energy nodes 10. The energy nodes 10 which will receive energy can receive it from neighboring energy nodes 10, and vice versa, and/or from anywhere in the grid. In an additional embodiment, the central allocation control device 40 can include its own power storage equipment and/or power transmission equipment in order to have a further buffer of energy for the community 20 and/or to manage the transmissions.

In an embodiment, the energy nodes 10 include households with their own (renewable) energy generation, electric load and electricity storage. The generation can come from solar panels or a small windmill. It is uncontrollable, but relatively predictable. Similarly, the local load is also uncontrollable (no demand-side management assumed at this stage). As the energy storage equipment standard residential batteries, such as the NEC household energy storage system ESS-H-002006A by NEC CORP. can be used to store renewable energy.

In another embodiment, the energy nodes 10 include renewable energy producers (such as a wind power producer) offering energy at a two settlement electricity market. In a two settlement market, an amount of energy according to a prediction of future generation is sold in advance, such as in day-ahead markets. If the actual generation happens to be lower than predicted, the producer has to pay a penalty. This is similar to the residential case, since this penalty can be seen as BuyingPrice$^t$ for the power difference between the load (here, power agreed in advance, hence uncontrollable) and the actual generation. If it happens that the actual generation is actually higher than the agreed amount, the difference can be sold in a spot market, possibly resulting in a low price. Energy producers could acquire small storages to mitigate deviations from the predictions. Furthermore, working together in a community can improve their overall results.

The collaborative load balancing of the participating energy nodes obtained by the systems and methods discussed herein offers a number of advantages. Each participating energy node virtually expands its own storage capabilities through collaboration with the other participating energy nodes. In an embodiment, the proposed system is based on the assumption that supply, demand and state-of-charge (SOC) vary across the user-set and time, allowing energy nodes with a current resource surplus to share it with other energy nodes and get it back later when it is needed. This eventually leads to financial gains for the participants. Additional advantages in the same or different embodiments can include:

The efficient use of renewable energies across a community of prosumers with electricity storage using selfish nodes and a coordinating node inside the community;

Collaborative information exchange on supply-demand pattern for current and future time horizons—collaboration protocol via a central communication unit;

Node-specific selfish decisions for node-specific resources (local control) in relation to available community resources (e.g. virtual storage capacity); and Use of a planning horizon to provide a feedback from the central allocation control device on the potential for resource exchange in the future.

In an embodiment, the central allocation control device 40 can include, manage and update the credit system for the entire community, manage the exchange of information to/from the energy nodes 10 (such as current values of variables or parameters or predicted values of the planning horizon) and decide which nodes will supply or receive energy using the allocation algorithm 42. Decisions are communicated to the local agent devices 30.

In an embodiment, the local agent devices 30 predict their own supply and demand over the planning horizon, request to supply energy to or receive energy from the community at different time intervals (for example, based on the solutions to the optimization problem) and iteratively updates decisions on what to request in the time intervals using feedback from the central allocation control device 40.

The present invention can also be applied to other applications, for example, in the computing field. Any community, be it prosumers or energy producers or another association of persons or entities, sharing resources, energy or otherwise, can benefit from the inventive system. For example, a group of data centers using RES could significantly enhance their overall computing abilities made possible by RES by predicting their own local power generation and/or usage (for example, predictions of bandwidth and computational load which will be required) over a planning horizon, in accordance with the considerations discussed herein, and/or share this information among the data centers to achieve a collaborative load balancing. In such an embodiment, the energy nodes would not need to exchange power directly, but rather make available computational power to the other energy nodes not having a sufficient amount of RES when these energy nodes have a surplus of useable RES. Therefore, in such an embodiment, the data centers could be considered to be the energy nodes and could each have their own local agent device as well as a central allocation control device, configured as discussed above.

Further, while discussed above in relation to RES, an embodiment of the present invention is also useable with respect to other types of energy which are produced by energy nodes that can form an association with each other to provide the collaborative balancing. For example, the prosumers or energy producers could also generate and/or consume power from natural gas or other energy sources, such as in a community of landowners having their own natural gas wells (assuming an arrangement for use of the gas wells which is subject to some fluctuation or uncertainty over time, or that the production is itself uncertain, but predictable).

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A system for collaborative load balancing within a community of a plurality of energy nodes, the system comprising:
   a central allocation server having a processor; and
   a plurality of local agent servers, each of the local agent servers being connected to a respective one of the energy nodes and having a processor configured to:
      receive input variables or parameters from the respective one of the energy nodes,
      predict, using the received input variables or parameters, a non-zero energy generation amount that power generation equipment of the respective one of the energy nodes can generate over a planning horizon and an energy consumption amount that the respective one of the energy nodes will consume over the planning horizon,
      solve, using the predicted energy generation amount and the predicted energy consumption amount, an optimization problem over the planning horizon, and
      communicate a solution to the optimization problem to the central allocation server,
   wherein the processor of the central allocation server is configured to:
      receive the solutions to the optimization problem from each of the local agent servers, and
      run an allocation algorithm using the solutions received from each of the local agent servers to determine an amount of energy to be received from or supplied to individual ones of the energy nodes, wherein the community of the plurality of energy nodes is collaboratively load balanced according to the allocation algorithm, and
   wherein each of the energy nodes includes power generation equipment, power transmission equipment, and power storage equipment.

2. The system according to claim 1, wherein at least one of the central allocation server and the local agent servers include a memory device configured to store a credit balance for each of the energy nodes, wherein the credit balance is respectively increased or decreased based on whether a respective one of the energy nodes has supplied energy to the community or received energy from the community.

3. The system according to claim 2, wherein the central allocation server is configured to favor requests to supply energy to the community for the energy nodes which have a negative credit balance and to favor requests to receive energy from the community for the energy nodes which have a positive balance.

4. The system according to claim 2, wherein the central allocation server is configured to estimate a possible energy exchange for each of the energy nodes based on the credit balances.

5. The system according to claim 1, wherein the local agent servers are configured to predict the energy generation amount using a weather forecast and are configured to predict the energy consumption amount using past usage data stored in a memory device located at one or more of the central allocation server and the local agent servers.

6. A central allocation server associated with a community of a plurality of energy nodes, the central allocation server comprising:

a receiver configured to receive, from a plurality of local agent servers, requests to supply energy to the community or to receive energy from the community, wherein each of the plurality of local agent servers is connected to a respective one of the energy nodes, wherein each of the requests received from the plurality of local agent servers is a solution provided by a respective one of the plurality of local agent servers, the solution obtained by solving an optimization problem by using a predicted energy generation amount and a predicted energy consumption amount, and wherein the predicted energy generation amount is a non-zero amount of energy that power generation equipment of the respective one of the energy nodes is predicted to be able to generate over a planning horizon and the predicted energy consumption amount is an amount of energy that the respective one of the energy nodes is predicted to consume over the planning horizon;

a computational processor configured to run an allocation algorithm configured to determine an amount of energy to be received from or supplied to individual ones of the energy nodes, wherein the community of the plurality of energy nodes is collaboratively load balanced according to the allocation algorithm; and a transmitter configured to communicate to each of the local agent servers the amount of energy which will be received from or supplied to the energy node associated therewith, wherein each of the energy nodes includes power generation equipment, power transmission equipment, and power storage equipment.

7. The central allocation server according to claim 6, wherein the central allocation server further comprises memory devices containing a credit balance for each of the energy nodes.

8. The central allocation server according to claim 7, wherein the central allocation server is configured to respectively increase or decrease the credit balances based on whether a respective one of the energy nodes has supplied energy to the community or received energy from the community.

9. The central allocation server according to claim 8, wherein the central allocation server is configured to favor the requests to supply energy to the community for the energy nodes which have a negative credit balance and to favor the requests to receive energy from the community for the energy nodes which have a positive balance.

10. The central allocation server according to claim 7, wherein the central allocation server is configured to estimate a possible energy exchange for each of the energy nodes based on the credit balances.

11. A method of providing a collaborative load balancing in a community of a plurality of energy nodes, the method comprising:

receiving, by a receiver of a central allocation server from a plurality of local agent servers, each of which is connected to a respective one of the energy nodes, requests to supply energy to the community or to receive energy from the community, wherein each of the requests received from the plurality of local agent servers is a solution provided by a respective one of the plurality of local agent servers, the solution obtained by solving an optimization problem by using a predicted energy generation amount and a predicted energy consumption amount, wherein the predicted energy generation amount is a non-zero amount of energy that power generation equipment of the respective one of the energy nodes is predicted to be able to generate over a planning horizon and the predicted energy consumption amount is an amount of energy that the respective one of the energy nodes is predicted to consume over the planning horizon; and determining, by a computational processor of a central allocation server, an amount of energy to be received from or supplied to individual ones of the energy nodes based on the requests received from the plurality of local agent servers and credit balances of the energy nodes, wherein the community of the plurality of energy nodes is collaboratively load balanced according to the allocation algorithm, wherein each of the energy nodes includes power generation equipment, power transmission equipment, and power storage equipment.

12. The method according to claim 11, further comprising increasing or decreasing the credit balances, stored in a memory of at least one of the central allocation server and the local agent servers, for each of the energy nodes respectively based on whether a respective one of the energy nodes has supplied energy to the community or received energy from the community.

13. The method according to claim 11, wherein the central allocation server, during the determining, is configured to favor requests to supply energy to the community for the energy nodes which have a negative credit balance and to favor requests to receive energy from the community for the energy nodes which have a positive balance.

14. The method according to claim 11, further comprising estimating, by the central allocation server, a possible energy exchange for each of the energy nodes based on the credit balances and communicating the estimation to respective ones of the local agent servers.

15. The method according to claim 11, wherein the energy generation amount is predicted by the respective one of the plurality of local agent servers using a weather forecast and wherein the energy consumption amount is predicted by using past usage data stored in a memory device of at least one of the central allocation server and the local agent servers.

* * * * *